US012632176B2

(12) United States Patent
Fraenkel-Saban et al.

(10) Patent No.: US 12,632,176 B2
(45) Date of Patent: May 19, 2026

(54) CHOOSING AMONG STORAGE OPTIMIZATIONS WHEN STORING CANDIDATE DATA

(71) Applicant: Dell Products L.P., Round Rock, TX (US)

(72) Inventors: Rachel Fraenkel-Saban, Yeruham (IL); Uri Shabi, Tel Mond (IL); Aleksey Kabishcher, Milford, NH (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 18/609,303

(22) Filed: Mar. 19, 2024

(65) Prior Publication Data

US 2025/0298509 A1      Sep. 25, 2025

(51) Int. Cl.
*G06F 3/06*          (2006.01)
(52) U.S. Cl.
CPC ........... *G06F 3/0608* (2013.01); *G06F 3/061* (2013.01); *G06F 3/0641* (2013.01); *G06F 3/0661* (2013.01); *G06F 3/0683* (2013.01)
(58) Field of Classification Search
None
See application file for complete search history.

(56) References Cited

U.S. PATENT DOCUMENTS

| | | | |
|---|---|---|---|
| 9,606,870 B1 | 3/2017 | Meiri et al. | |
| 10,216,654 B1 | 2/2019 | Zhao et al. | |
| 10,613,755 B1 | 4/2020 | Sela et al. | |
| 10,628,379 B1 | 4/2020 | Sela et al. | |
| 10,635,315 B1 * | 4/2020 | Armangau ........... | G06F 3/0641 |
| 10,664,165 B1 * | 5/2020 | Faibish ................ | G06F 3/0638 |
| 10,831,370 B1 * | 11/2020 | Shilane ................ | G06F 3/0661 |
| 11,048,426 B2 * | 6/2021 | Shabi .................... | G06F 3/0608 |
| 2021/0064659 A1 * | 3/2021 | O'Hare ............... | H03M 7/3091 |
| 2021/0132813 A1 * | 5/2021 | Shabi .................... | G06F 3/0659 |

* cited by examiner

*Primary Examiner* — Michael Alsip
(74) *Attorney, Agent, or Firm* — BainwoodHuang

(57) ABSTRACT

A data storage technique involves detecting that candidate data is deduplicatable within a storage array. The technique further involves, in response to detecting that the candidate data is deduplicatable within the storage array, evaluating whether to perform a compression operation on the candidate data in place of performing a deduplication operation on the candidate data and providing an optimization decision indicating whether to perform the deduplication operation on the candidate data in place of performing the deduplication operation on the candidate data. The technique further involves performing, within the storage array, a storage optimization operation on the candidate data based on the optimization decision, the storage optimization operation including one of the deduplication operation to deduplicate the candidate data and the compression operation to compress the candidate data.

20 Claims, 5 Drawing Sheets

100

102

240

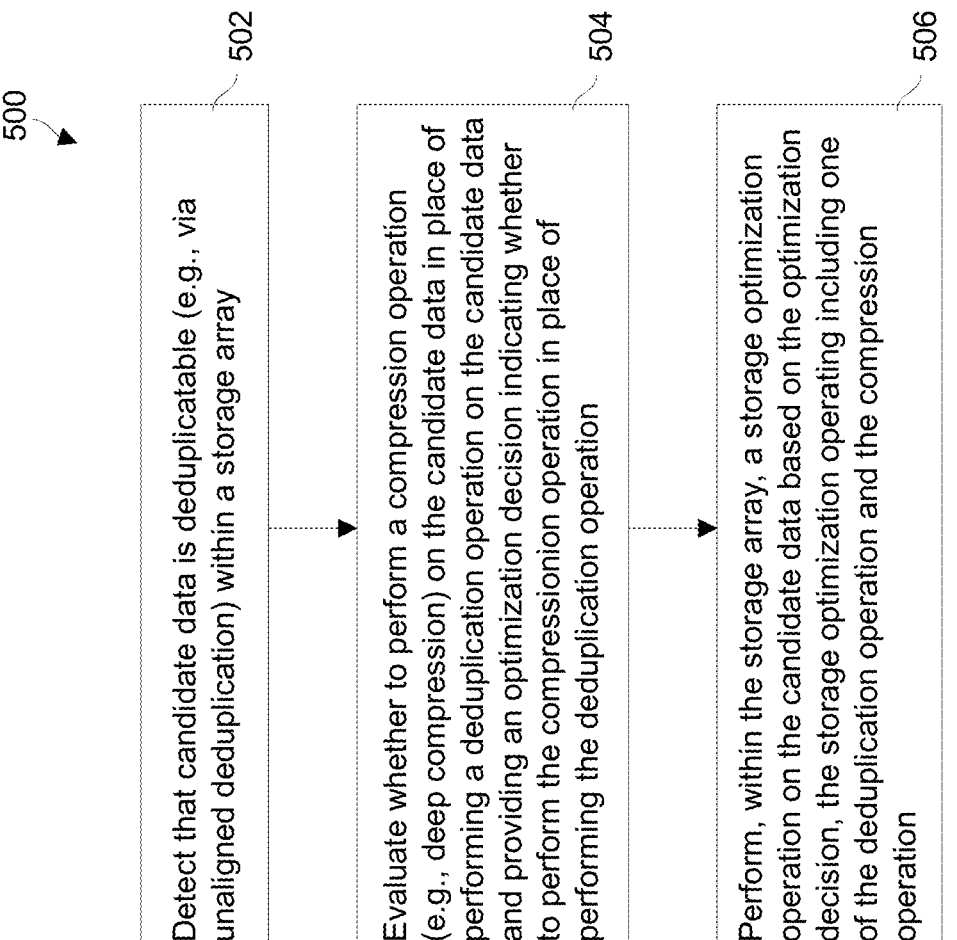

500

Detect that candidate data is deduplicatable (e.g., via unaligned deduplication) within a storage array

502

Evaluate whether to perform a compression operation (e.g., deep compression) on the candidate data in place of performing a deduplication operation on the candidate data and providing an optimization decision indicating whether to perform the compressionion operation in place of performing the deduplication operation

504

Perform, within the storage array, a storage optimization operation on the candidate data based on the optimization decision, the storage optimization operating including one of the deduplication operation and the compression operation

CHOOSING AMONG STORAGE OPTIMIZATIONS WHEN STORING CANDIDATE DATA

BACKGROUND

Conventional data storage systems include storage processors that perform data storage operations on behalf of host computers. Along these lines, in response to storage commands from the host computers, the storage processors write host data into and read host data from storage drives.

One conventional data storage system attempts to optimize storage space utilization within the storage drives by performing deduplication on the host data. If deduplication is unsuccessful, the conventional data storage system attempts to perform unaligned deduplication on the host data (i.e., deduplication of the host data based on previously stored shifted data). If unaligned deduplication is unsuccessful, the conventional data storage system performs data compression (e.g., page compression if the host data is on a single page, or deep compression if the host data is on multiple adjacent pages).

SUMMARY

Unfortunately, there are deficiencies to the above-described conventional data storage system which performs data compression on host data only after deduplication and unaligned deduplication attempts are unsuccessful. For example, there may be some situations in which it is preferable to perform deep data compression rather than unaligned deduplication. Along these lines, suppose that a particular application places higher importance on low read latency rather than storage space efficiency provided by unaligned deduplication. In such a situation, the particular application may perform poorly because reading data from unaligned deduplication may be slower than reading data from deep compression (e.g., read operations involving decompressing data may take less time than read operations which obtain data from unaligned deduplication).

Improved techniques are directed to choosing among storage optimizations when storing candidate data. For example, specialized circuitry may choose between unaligned deduplication optimization and deep compression optimization when storing the candidate data. Such optimization selection enables the specialized circuitry to accommodate certain situations such as applications which place higher importance on low read latency compared to storage efficiency gained by performing unaligned deduplication over deep compression. Moreover, such optimization selection may be performed during inline processing of cached data en route (e.g., flushing the candidate data out of cache) to secondary storage without heavy calculations. Along these lines, a compressibility estimate may be made quickly on candidate data since actual compression length information is already available due to prior storage of data that would enable unaligned deduplication of the candidate data. Accordingly, the selection operation has minimal to no impact on storing the candidate data, and the option of using deep compression optimization in place of unaligned deduplication optimization may be well suited when low read latency is desirable.

One embodiment is directed to a data storage method which includes detecting that candidate data is deduplicatable within a storage array. The method further includes, in response to detecting that the candidate data is deduplicatable within the storage array, evaluating whether to perform a compression operation on the candidate data in place of performing a deduplication operation on the candidate data and providing an optimization decision indicating whether to perform the compression operation on the candidate data in place of performing the deduplication operation on the candidate data. The method further includes performing, within the storage array, a storage optimization operation on the candidate data based on the optimization decision, the storage optimization operation including one of the deduplication operation to deduplicate the candidate data and the compression operation to compress the candidate data.

Another embodiment is directed to data storage equipment which includes memory and control circuitry coupled with the memory. The memory stores instructions which, when carried out by the control circuitry, cause the control circuitry to perform a method of:

(A) detecting that candidate data is deduplicatable within a storage array, (B) in response to detecting that the candidate data is deduplicatable within the storage array, evaluating whether to perform a compression operation on the candidate data in place of performing a deduplication operation on the candidate data and providing an optimization decision indicating whether to perform the compression operation on the candidate data in place of performing the deduplication operation on the candidate data, and (C) performing, within the storage array, a storage optimization operation on the candidate data based on the optimization decision, the storage optimization operation including one of the deduplication operation to deduplicate the candidate data and the compression operation to compress the candidate data.

Yet another embodiment is directed to a computer program product having a non-transitory computer readable medium which stores a set of instructions to perform data storage. The set of instructions, when carried out by computerized circuitry, causes the computerized circuitry to perform a method of:

(A) detecting that candidate data is deduplicatable within a storage array;

(B) in response to detecting that the candidate data is deduplicatable within the storage array, evaluating whether to perform a compression operation on the candidate data in place of performing a deduplication operation on the candidate data and providing an optimization decision indicating whether to perform the compression operation on the candidate data in place of performing the deduplication operation on the candidate data; and (C) performing, within the storage array, a storage optimization operation on the candidate data based on the optimization decision, the storage optimization operation including one of the deduplication operation to deduplicate the candidate data and the compression operation to compress the candidate data.

In some arrangements, the storage array stores previously-stored data which is unaligned with native page boundaries. Additionally, detecting that the candidate data is deduplicatable includes ascertaining that the candidate data is able to be deduplicated using the previously-stored data which is unaligned with the native page boundaries.

In some arrangements, evaluating and generating includes providing, as the optimization decision, a result signal indicating whether to perform a deep compression operation on the candidate data in place of performing an unaligned dedupe operation on the candidate data.

In some arrangements, the storage array stores the previously-stored data across multiple pages in which the previously-stored data starts in a middle of a first page and ends in a middle of a second page. Additionally, performing the storage optimization operation includes, based on the result signal, performing one of (i) an unaligned dedupe operation to deduplicate the candidate data using the previously-stored data stored across the multiple pages and (ii) a deep compression operation to compress multiple pages of data, the multiple pages of data including the candidate data.

In Some Arrangements, Evaluating and Generating Includes:

computing an estimated data compression size for the candidate data, and selecting, as the optimization decision, (i) a first value which identifies the compression operation when the estimated data compression size is less than the predefined threshold and (ii) a second value which identifies the deduplication operation when the estimated data compression size is greater than a predefined threshold.

In some arrangements, the storage array stores a first page and a second page. A dedupe candidate page of the candidate data is provided unaligned with native page boundaries by the first page and the second page. Additionally, computing the estimated data compression size includes:

(i) obtaining a first compressed length of the first page and a second compressed length of the second page, and (ii) deriving the estimated data compression size from the first compressed length and the second compressed length.

In some arrangements, the dedupe candidate page is provided by a first amount of the first page and a second amount of the second page. Additionally, deriving the estimated data compression size includes computing, as the estimated data compression size, a weighted average based on the first compressed length, the first amount of the first page, the second compressed length, and the second amount of the second page.

In some arrangements, the method further includes, prior to detecting that candidate data is deduplicatable within the storage array, storing the first page and the second page within the storage array as at least part of a deep compression group.

In some arrangements, the storage array is constructed and arranged to perform inline unaligned deduplication and inline deep compression. Additionally, the storage optimization operation is performed as the candidate data is being flushed en route along an input/output (I/O) path from a cache of the storage array to secondary storage of the storage array.

In some arrangements, the storage array is constructed and arranged to perform post-processing unaligned deduplication and post-processing deep compression. Additionally, the storage optimization operation is performed as the candidate data is being post-processed after the candidate data has been flushed from a cache of the storage array.

It should be understood that, in the cloud context, at least some electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in choosing among storage optimizations when storing candidate data.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is a flowchart of a procedure which chooses among storage optimizations when storing candidate data in accordance with certain embodiments.

DETAILED DESCRIPTION

An improved technique is directed to choosing among storage optimizations when storing candidate data. For example, specialized circuitry may choose between unaligned deduplication optimization and deep compression optimization when storing the candidate data. Such optimization selection enables the specialized circuitry to accommodate certain situations such as those which place higher importance on low read latency compared to the incremental storage efficiency gained by performing unaligned deduplication over deep compression. Moreover, such optimization selection may be performed during inline processing of cached data en route (e.g., flushing candidate data out of cache) to secondary storage without heavy calculations. Along these lines, a compressibility estimate may be made quickly on the candidate data since actual compression length information is already available due to prior storage of data that would enable unaligned deduplication of the candidate data. As a result, the selection operation has minimal to no impact on storing the candidate data, and the option of using deep compression optimization in place of unaligned deduplication optimization may be advantageous when low read latency is desirable.

Figure 1:
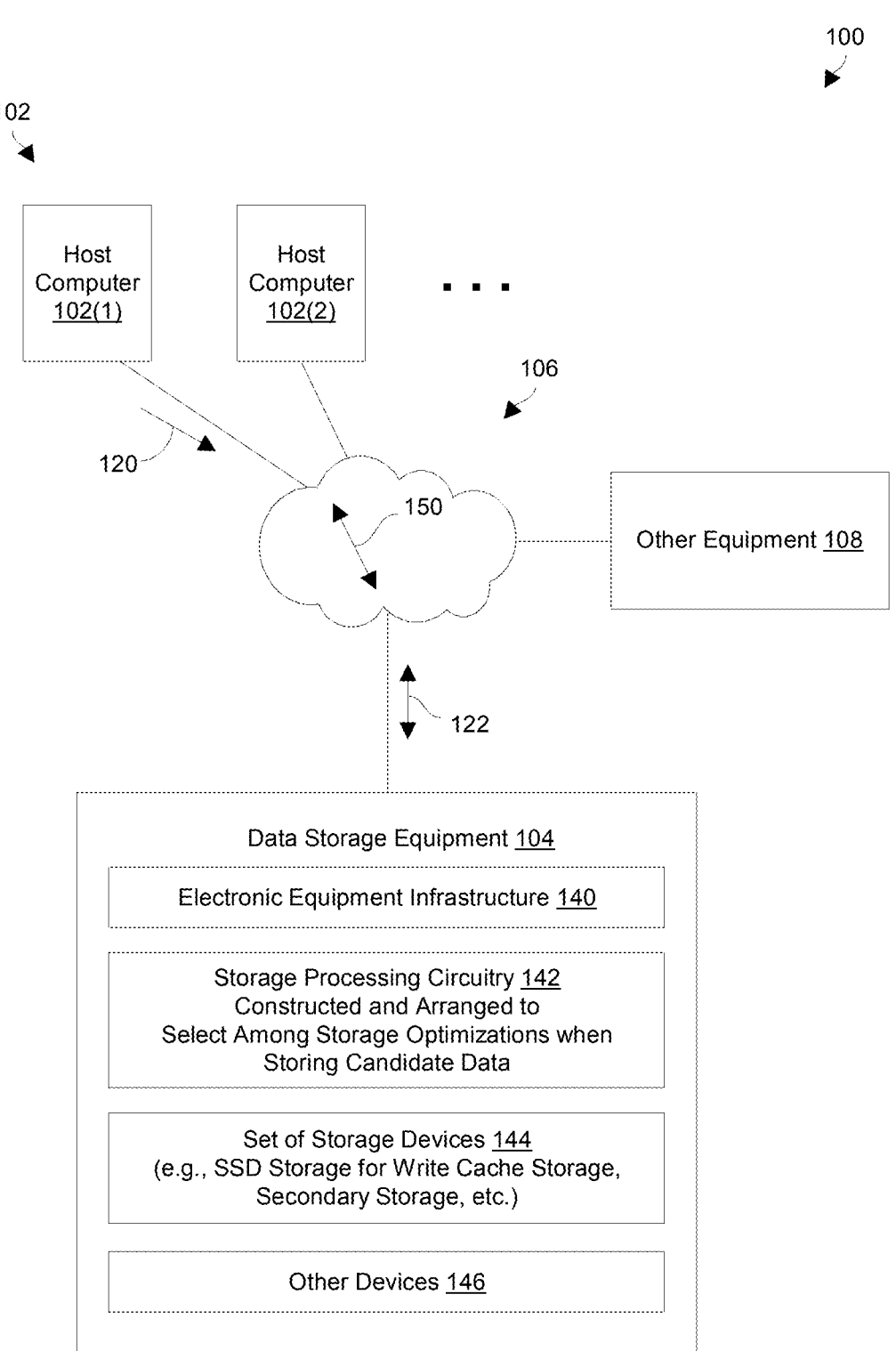
FIG. 1 is a block diagram of a data storage environment which chooses among storage optimizations when storing candidate data in accordance with certain embodiments.

FIG. 1 is a block diagram of a data storage environment 100 which chooses among storage optimizations when storing candidate data in accordance with certain embodiments. The data storage environment 100 includes host computers 102(1), 102(2), . . . (collectively, host computers 102), data storage equipment 104, a communications medium 106, and perhaps other equipment 108.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to store host data 122 within and retrieve host data 122 from storage (e.g., primary storage or main memory, secondary storage, tiered storage, combinations thereof, etc.).

The data storage equipment 104 is an example of electronic equipment that is capable of choosing among storage optimizations when storing candidate data. The data storage equipment 104 includes an electronic equipment infrastructure 140, storage processing circuitry 142, a set of storage devices 144, and other devices 146.

The electronic equipment infrastructure 140 is constructed and arranged to support operation of various components of the data storage equipment 104. To this end, the electronic equipment infrastructure 140 positions the various components relative to each other, conveys power signals from power converters to the various components, positions fans along air pathways to provide cooling to the various components (i.e., to remove heat), protects the various components against tampering, damage, and so on. Along these lines, the electronic equipment infrastructure 140 may include one or more frames or card cages, chassis/ housings/cabinets, power supplies/converters, fans, backplanes or midplanes, and so on.

The storage processing circuitry 142 is constructed and arranged to respond to the host I/O requests 120 received from the host computers 102 by writing data into the set of storage devices 144 and reading the data from the set of storage devices 144. The storage processing circuitry 142 may include one or more physical storage processing modules or engines, data movers, director boards, blades, etc. In accordance with certain embodiments, the storage processing circuitry 142 may include a variety of specialized subcomponents such as processing circuitry to process I/O requests 120 from the host computers 102, cache memory to operate as read and/or write caches, on-board NICs to provide communications between the storage processing circuitry 142 and/or external devices, LEDs, switches for local I/O, and so on.

The set of storage devices 144 is constructed and arranged to store data within the data storage equipment 104. In accordance with certain embodiments, the set of storage devices 144 may arrange the data in accordance with one or more data protection schemes (e.g., RAID1, RAID5, RAID6, RAID10, etc.). Example storage devices 144 include RAM devices, NVRAM devices, other solid state memory devices (SSDs), hard disk drives (HDDs), combinations thereof, and so on.

In accordance with certain embodiments, the storage processing circuitry 142 is constructed and arranged to choose among storage optimizations when storing candidate data. As will be explained in further detail shortly, such optimizations may include unaligned deduplication and deep compression where deep compression is selected over unaligned deduplication when the storage processing circuitry 142 estimates the candidate data to satisfy a set of compressibility requirements. Such selection may not only achieve storage optimization but also provide other advantages such as low read latency, situations of very compact compression, combinations thereof, and so on.

The other devices 146 of the data storage equipment 104 are constructed and arranged to provide supporting features. Along these lines, the other devices 146 may include a set of communications interfaces (e.g., a set of discrete network interface controllers or NICs) that provide communications for the data storage equipment 104, a user interface for local user access, backup power sources, and so on.

The communications medium 106 is constructed and arranged to connect the various components of the data storage environment 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other equipment 108 represents other possible componentry of the data storage environment 100. Along these lines, the other equipment 108 may include remote data storage equipment that provides data to and/or receives data from the data storage equipment 104 (e.g., replication arrays, backup and/or archiving equipment, external service processors and/or other management/control devices, etc.).

During operation, the data storage equipment 104 processes I/O requests 120 from the set of host computers 102 to perform useful work. In particular, the storage processing circuitry 142 writes host data 122 into and retrieves host data 122 from the set of storage devices 144 in response to the I/O requests 120.

During such operation, the storage processing circuitry 142 temporarily buffers (or caches) data en route to the set of storage devices 144. As the data is further processed in this inline manner, the data may be optimized for storage such as via deduplication, compression, and so on. In accordance with certain embodiments, the storage processing circuitry 142 selects between deduplication optimization and compression optimization in certain situations to improve performance of the data storage equipment 104. Further details will now be provided with reference to FIG. 2.

Figure 2:
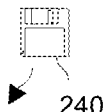
FIG. 2 is a block diagram of electronic circuitry of the data storage environment of FIG. 1 in accordance with certain embodiments.
Figure 2:
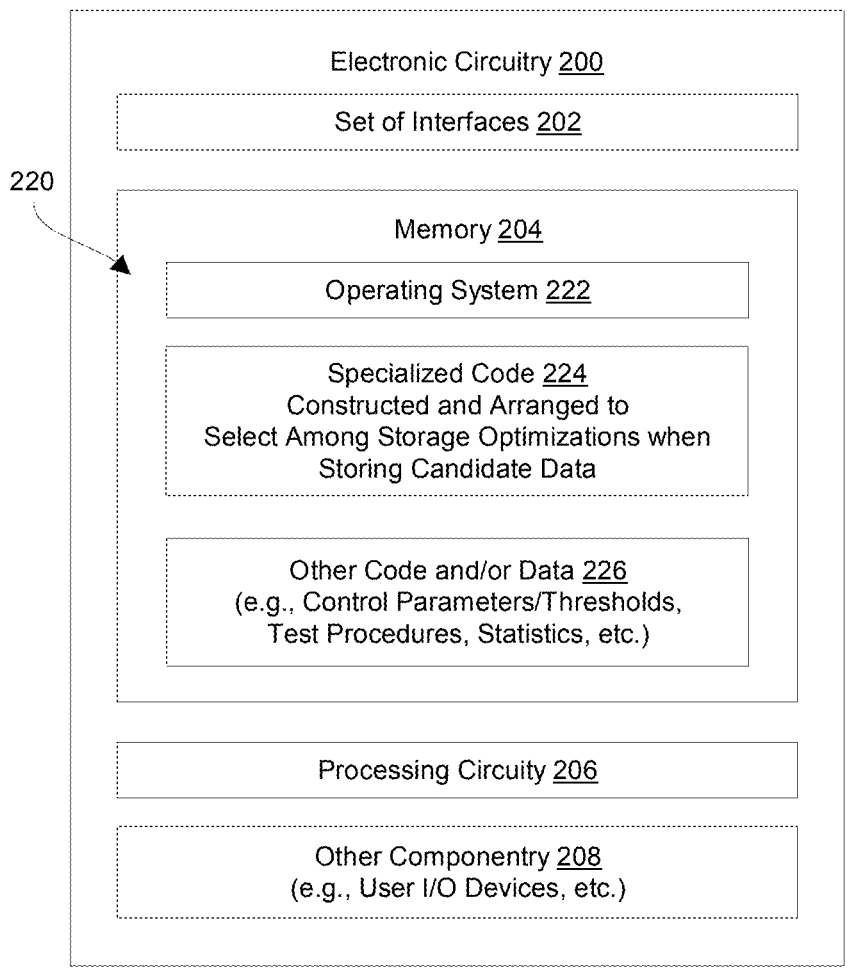

FIG. 2 shows electronic circuitry 200 which is suitable for at least a portion of the data storage equipment 104 in accordance with certain embodiments (e.g., see the storage processing circuitry 142 in FIG. 1). The electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 106 (FIG. 1) to enable communications with other devices of the data storage environment 100. Such communications may be IP-based, SAN-based, cellular-based, cable-based, fiber-optic based, wireless, cloud-based, combinations thereof, and so on. Additionally, the set of interfaces 202 is constructed and arranged to connect the electronic circuitry 200 to other local equipment. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions and/or other software constructs for, among other things, selecting among storage optimizations when storing candidate data. The other code and data 226 refers to control parameters/thresholds, tools, routines, test procedures, statistics, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably enables the electronic circuitry 200 to perform data storage operations as well as choose storage optimizations when storing candidate data. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a local user I/O circuitry, circuitry for fault tolerance, etc. Further details will now be provided with reference to FIGS. 3 and 4.

Figure 3:
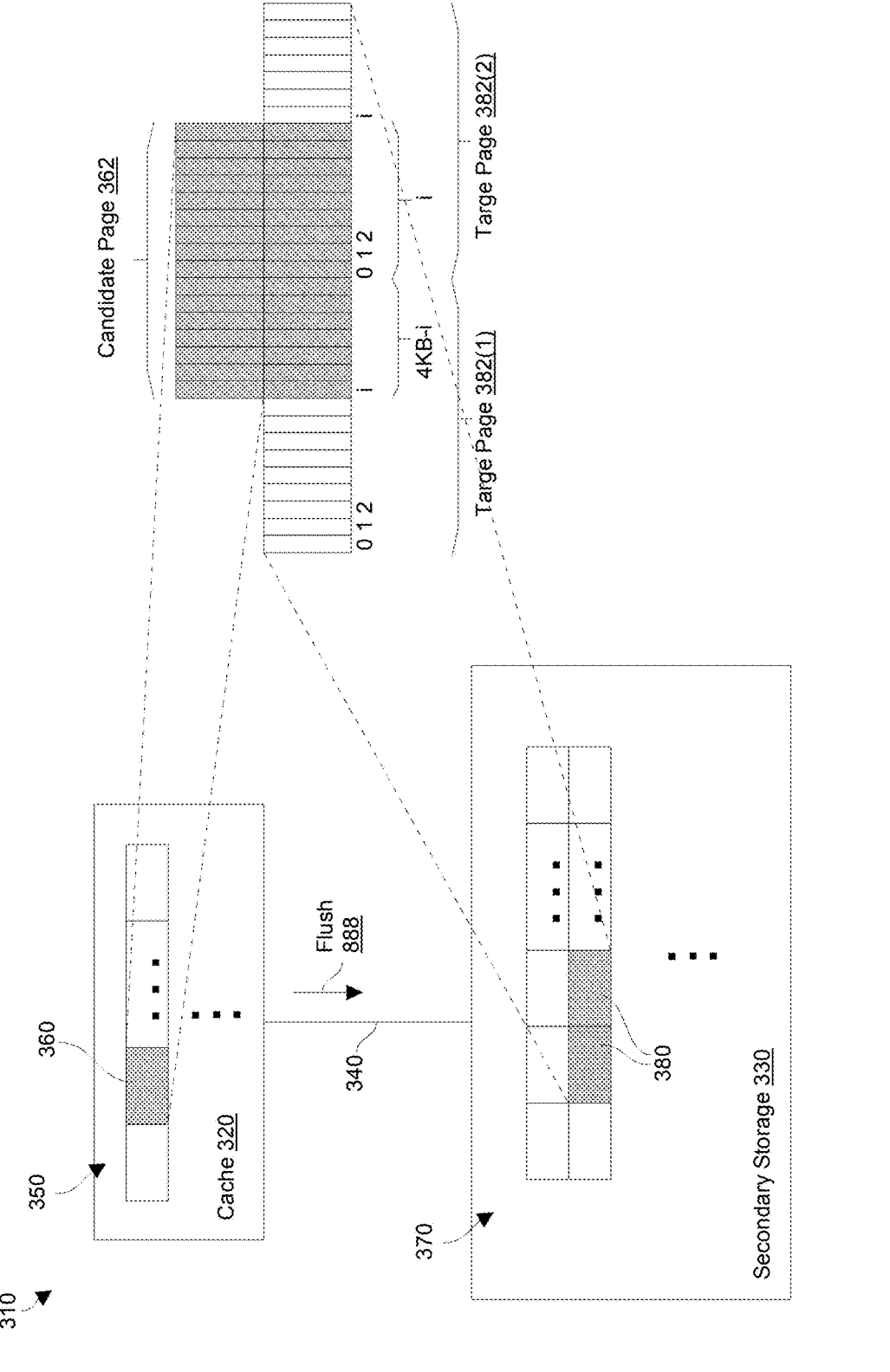
FIG. 3 is a block diagram illustrating particular unaligned deduplication details in accordance with certain embodiments.
Figure 4:
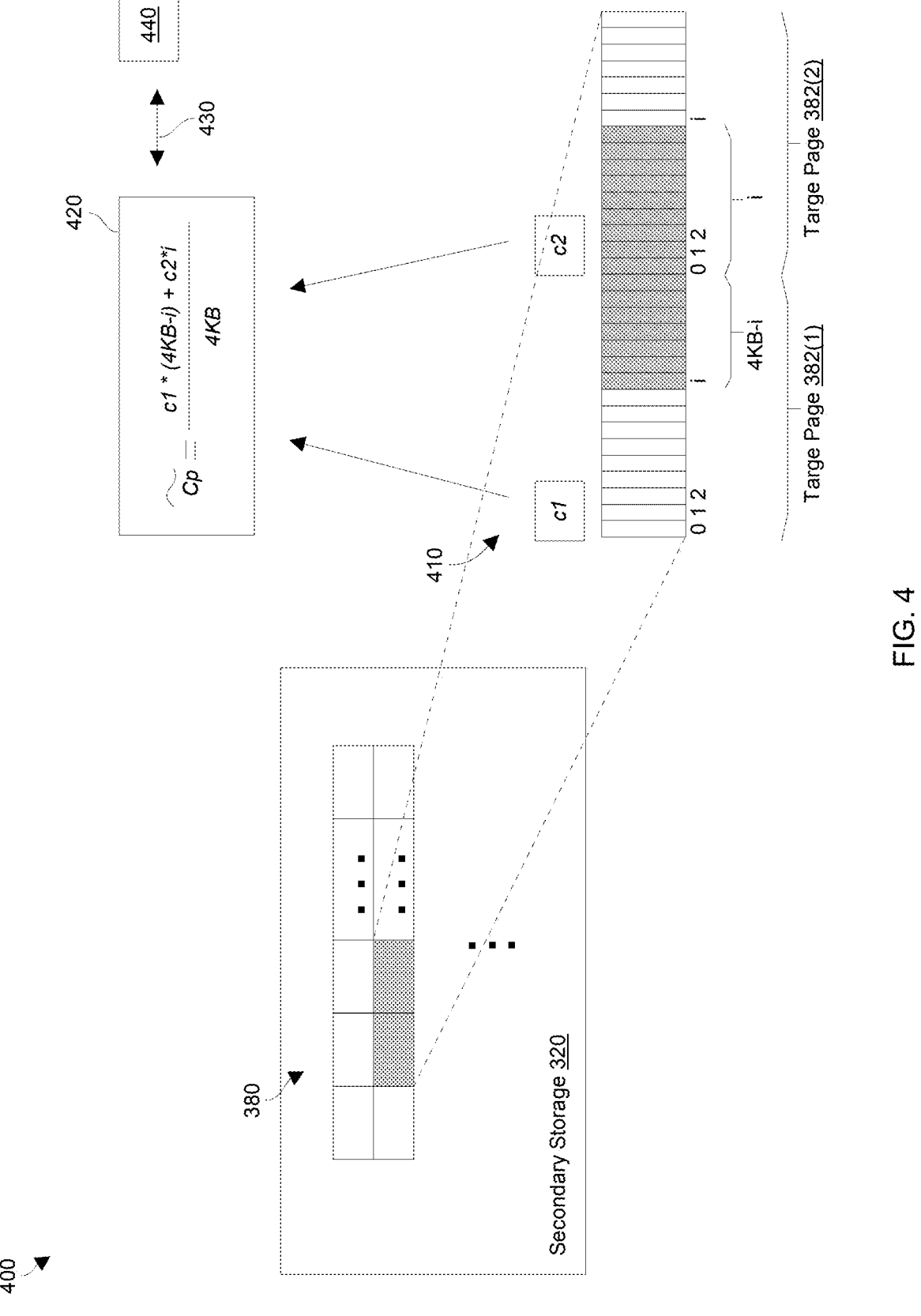
FIG. 4 is a block diagram illustrating particular compression estimating details in accordance with certain embodiments.

FIGS. 3 and 4 provide certain processing details in accordance with certain embodiments. FIG. 3 shows particular unaligned deduplication details in accordance with certain embodiments. FIG. 4 shows particular compression estimating details in accordance with certain embodiments.

FIG. 3 shows a view 300 of certain components of an I/O stack (or path) 310 of the data storage equipment 104. The I/O stack 310 includes a cache 320, secondary storage 330, and perhaps intermediate components 340 (e.g., shown as a line 340 in FIG. 3 for simplicity but which may include buses, adaptors, other caches, combinations thereof, etc.). During operation, the I/O stack 310 performs inline processing of data en route to the secondary storage 330. Along these lines, the cache 320 may be a write cache which stores data to be flushed and eventually committed (e.g., via late binding).

The cache 320 provides storage (e.g., page locations) 350 which caches candidate data 360 for storing in the secondary storage 330. Along these lines, the candidate data 360 includes a candidate page 362 of data en route to the secondary storage 330.

As further shown in FIG. 3, the secondary storage 330 provides storage (e.g., page locations) 370 which stores non-volatile data 380 in a non-volatile manner (also see the set of storage devices 144 in FIG. 1). Along these lines, the non-volatile data 380 includes previously stored adjacent target pages 382(1), 382(2) which supports unaligned deduplication of the candidate data 362 of data. In particular, the target pages 382(1), 382(2) may belong to a deep compression group and have a relative compressed length.

As will now be explained, the data storage equipment 104 is capable of performing unaligned deduplication under certain circumstances. To perform unaligned deduplication of the candidate page 362, the storage processing circuitry 142 finds the two target pages 382(1), 382(2) that contain the candidate page 362 in an unaligned or shifted manner. That is, the candidate page 362 is not aligned with the natural page boundaries of the target pages 382(1), 382(2), but instead begins somewhere in the middle of the target page 382(1) and ends in the somewhere in the middle of the target page 382(2).

In particular, as shown in FIG. 3, the data for deduplicating the candidate page 362 starts at the unaligned offset i in the target page 382(1) and continues to the end of the target page 382(1). Additionally, the data starts at the beginning of the target page 382(2) and further continues up to the offset i in the target page 382(2). Accordingly and as shown in FIG. 3, if the candidate page 362 is 4 KB in size, then 4 KB-i of the candidate page 362 resides at the end of the target page 382(1), and i of the candidate page 362 resides at the beginning of the target page 382(2) (where 4 KB-i and i are amounts of data).

It should be appreciated that since the data for deduplicating the candidate page 362 is available among the target pages 382(1), 382(2), the candidate page 362 may be deduplicated via unaligned deduplication. The cost for such deduplication is the deduplication processing work, storage of metadata that tracks the target pages and offset, and the processing work for re-acquiring the data from the target pages during a read operation. It should be understood that latency to re-acquire the data resulting from such unaligned deduplication can be relatively high compared to decompression.

FIG. 4 shows a view 400 as to how a compression estimation may be generated for the candidate page 362 of FIG. 3. Along these lines, it should be understood that the data storage equipment 104 already knows the compressed lengths 410 for the pages 380 of data that have already been stored in the secondary storage 320. Accordingly, since the target pages 382(1), 382(2) have already been stored in the secondary storage 330, the data storage equipment 104 already knows the compressed lengths c1, c2 of the target pages 382(1), 382(2).

In accordance with certain embodiments, the storage processing circuitry 142 computes an estimated compressed length $\check{C}_p$ for the candidate page 362 from the known compressed lengths c1, c2 of the target pages 382(1), 382(2). Along these lines, the storage processing circuitry 142 performs a compression estimation operation 420 that generates a weighted average based on the known compressed lengths c1, c2 as follows:

$$C_p = \frac{c1 * (4\ KB - i) + c2 * i}{4\ KB} \tag{1}$$

where the page size is 4 KB and i is the offset of the candidate page 362 of data which is contained within the target pages 382(1), 382(2) already stored in the second storage 320 (also see FIG. 3). Using equation (1), the estimated compressed length $\tilde{C}_p$ has a value between 0 and 4 KB and is less heavy than using a full deep compression mechanism.

Once the estimated compressed length $\tilde{C}_p$ for the candidate page 362 is derived by the storage processing circuitry 142, the storage processing circuitry 142 decides whether to perform deduplication on the candidate page 362 or compression on the candidate page 362. In particular, deduplication would involve performing unaligned deduplication which requires storing the addresses of (or pointers to) the target pages 382(1), 382(2) and the offset i. Additionally, compression would involve performing a deep compression operation in which a series of multiple adjacent pages is compressed.

In accordance with certain embodiments, the choice of unaligned deduplication and deep compression is based on comparison 430 of the estimated compressed length $\tilde{C}_p$ to a predefined threshold 440 (a comparison operation 430 is illustrated by the double arrow 430 in FIG. 4). Such a threshold 440 may be tuned (or adjusted) over time and based on a variety of criteria. In some arrangements, the predefined threshold 440 places importance on keeping read latency low.

The following pseudo code is an example of how the selection operation may be performed by the data storage equipment 104 when choosing between unaligned deduplication and deep compression of candidate data 360 which includes the candidate page 362 (also see FIGS. 3 and 4):

> if ($\tilde{C}_p \leq$ predefined threshold 440)
> > mark the candidate page 362 as unique and add the candidate page 362 to the deep compression candidates
> else
> > mark the candidate page 362 as unique as unaligned dedupe of the target pages 382(1), 382(2)

Here, if the estimated compressed length $\tilde{C}_p$ is less than or equal to the predefined threshold 440, the data storage equipment 104 performs deep compression to optimize storage of the candidate page 362. However, if the estimated compressed length $\tilde{C}_p$ is greater than the predefined threshold 440, the data storage equipment 104 performs unaligned deduplication to optimize storage of the candidate page 362. Further details will now be provided with reference to FIG. 5.

FIG. 5 is a flowchart of a procedure 500 which chooses among storage optimizations when storing candidate data in accordance with certain embodiments. Such a procedure 500 may be performed by specialized circuitry of data storage equipment (e.g., see FIG. 1).

At 502, the specialized circuitry detects that candidate data is deduplicatable within a storage array. For example, the candidate data may currently reside in cache memory and be en route to secondary storage. Alternatively, the candidate data may be data at rest that has already been flushed from the cache.

In some arrangements, the specialized circuitry ascertains that the specialized circuitry is unable to deduplicate the candidate data using previously stored data that is aligned with natural page boundaries (i.e., unable to perform standard deduplication). However, the specialized circuitry is able to perform an unaligned deduplication operation using previously stored data that is unaligned with natural page boundaries.

At 504, the specialized circuitry, in response to detecting that the candidate data is deduplicatable within the storage array (e.g., via unaligned deduplication), evaluates whether to perform a compression operation on the candidate data (e.g., deep compression) in place of performing a deduplication operation on the candidate data and providing an optimization decision indicating whether to perform the compression operation on the candidate data in place of performing the deduplication operation on the candidate data.

In some arrangements, the specialized circuitry generates an estimated compressed length that would result if the specialized circuitry performs the compression operation and chooses whether to perform compression or deduplication based on a comparison of the estimated compressed length to a predefined threshold. It should be understood that the estimated compressed length may be based on a set of compressed lengths of previously stored data and thus may be done quickly without adding latency to a process of flushing the candidate data from cache memory.

At 506, the specialized circuitry performs, within the storage array, a storage optimization operation on the candidate data based on the optimization decision, the storage optimization operation including one of the deduplication operation to deduplicate the candidate data and the compression operation to compress the candidate data. Here, the specialized circuitry either performs compression or deduplication based on the optimization decision (e.g., a result signal).

It should be appreciated that, if the specialized circuitry performs deep compression on the candidate data rather than unaligned deduplication, the specialized circuitry may perform a subsequent read operation with lower latency. In contrast to conventional data storage systems which always perform unaligned deduplication over compression, the procedure 500 advantageously offers more flexibility by enabling an optimization decision that provides certain benefits such as faster reads via decompression.

As described above, improved techniques are directed to choosing among storage optimizations when storing candidate data. For example, specialized circuitry may choose between unaligned deduplication optimization and deep compression optimization when storing the candidate data. Such optimization selection enables the specialized circuitry to accommodate certain situations such as applications which place higher importance on low read latency compared to storage efficiency gained by performing unaligned deduplication over deep compression. Moreover, such optimization selection may be performed during inline processing of cached data en route (e.g., flushing the candidate data out of cache) to secondary storage without heavy calculations. Along these lines, a compressibility estimate may be made quickly on candidate data since actual compression length information is already available due to prior storage of data that would enable unaligned deduplication of the candidate data. Accordingly, the selection operation has minimal to no impact on storing the candidate data, and the option of using deep compression optimization in place of unaligned deduplication optimization may be well suited when low read latency is desirable.

One should appreciate that the above-described techniques do not merely process data. Rather, the disclosed techniques provide improvements to the technology of data storage. With such techniques, certain advantages are available such as enabling a decision to perform compression over deduplication to facilitate subsequent reading of the data, still providing storage optimization (e.g., the size of the candidate data is still reduced), and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 100 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Regarding standard (or normal aligned) deduplication, when a user writes the same data in two different addresses, the storage equipment holds this data in the memory only once and defines both user addresses to point to the same place in memory. In a 4 KB aligned addressing system (where memory addresses are aligned on 4 KB boundaries), the storage equipment detects aligned dedupes (full 4 KB aligned stream to full 4 KB aligned stream), and data in memory stays saved as long as there is at least one user address that points to it.

Regarding unaligned deduplication, if standard deduplication is unsuccessful (e.g., the storage equipment does not find any aligned dedupe for a page during flushing), the storage equipment looks for shifted dedupe or unaligned dedupe for it. That is, the storage equipment looks for two sequenced pages in memory that together contain the new page. In this situation, the page to be flushed may be a duplicate of 4 KB stream in the memory that starts in the middle of one 4 KB aligned page, and ends in the middle of a next 4 KB aligned page. These two sequenced pages may be referred to as the unaligned dedupe targets (e.g., see the target pages 382(1), 382(2) in FIGS. 3 and 4). In this case, the storage equipment saves the new page as unaligned dedupe by holding, in its user address, two pointers to the two targets addresses in memory (together with the relative index in the first target).

During standard page compression, in a 4 KB aligned address system, the storage equipment saves each 4 KB of data as one page. However, instead of just copying the 4 KB stream to memory as is, the storage equipment compresses it (e.g., by detecting duplicate lines and paragraphs within the 4 KB stream and finding a suitable, or most, compact form to write it in memory).

During deep compression, the storage equipment looks at multiple adjacent pages such as at eight pages in a row and tries compressing this group of pages together. Along these lines, the storage equipment is able to compress one 32 KB stream at least as well as eight compressions of individual 4 KB pages (or individual 4 KB streams). The eight pages compressed together may be referred to as a deep compression group.

For example, suppose there is a deep compression group (DCG) of n pages (n≤8). The storage equipment may define the relative compressed length of each page in the group to be:

$$\frac{DCG \cdot \text{length}}{n}. \tag{2}$$

It should be understood that conventional data storage systems just choose automatically unaligned dedupe, without considering the possible benefit of deep compression. Such conventional data storage systems may apply this rationale in order to avoid any effect of flush process latency.

In accordance with certain embodiments, a memory management system (e.g., see FIGS. 1 and 2) has two optional optimizations to save a flushed page (or a page during flushing): saving it as unaligned dedupe or writing it in memory in a compact form (deep compression). The decision as to which optimization is preferred is not absolute but depends on the compression quality of the specific page. Accordingly, the memory management system is configured to choose the better optimization for each page without actually compressing it and, by that, keep the efficiency of flush process unharmed.

In accordance with certain embodiments, specialized circuitry chooses between unaligned dedupe optimization and deep compression optimization without adding heavy calculations. Such techniques enable choosing the most beneficial optimization per incoming user write-flushed page, without causing latency in flush.

Consider that a page may be either an unaligned dedupe or saved in memory as part of deep compression group (or none of them), but not both. One may say that unaligned dedupe must always be a better choice (as deep compression group adds something to memory, while unaligned dedupe add nothing). However, since unaligned may have heavier side effect of latency in read process (two pages are extracted out of deep compressed groups, instead of one)— in cases of very compact compression, it may be preferred over unaligned dedupe. Accordingly, certain techniques disclosed herein provide an efficient way to choose the most benefit optimization for each unaligned dedupe candidate in terms of memory use and user-read request latency. This process efficiency may be viewed as critical as the storage equipment operates during flush and may provide effects immediately in terms of latency.

In accordance with certain embodiments, specialized circuitry initially detects that a candidate page is available for unaligned dedupe. However, before the specialized circuitry naively performs unaligned dedupe, the specialized circuitry attempts to ascertain how well the candidate page compresses (e.g., compared to some configurable threshold WELL_COMPRESSED_THRESHOLD), and only then choose between unaligned dedupe and deep compression.

The naive way is to simulate the deep-compression process with it and make the choice according to the returned relative compressed length. However, a drawback is that deep compression is a heavy process, and performing such a process would add latency in the flush process.

However, in accordance with certain embodiments, the specialized circuitry estimates the compactness of this new page without simulating the full deep compression mechanism, in the following way (also see FIGS. 3 and 4):

Let the candidate page 362 (or simply p) be the unaligned dedupe candidate page, and the target pages 382(1), 382(2) (or simply t_1, t_2) be two unaligned dedupe targets.

Let i be the unaligned offset of the candidate page 362, i.e., p=t_1 [i . . . 4 k–1]·t_2 [0 . . . i].

Also, let c_1, c_2 (also see c1 and c2 in FIG. 4) be the relative compressed lengths of t_1 and t_2, respectively (as t_1, t_2 are two pages in memory, each of them is part of deep compression group and have a relative compressed length).

Let $\tilde{C}_p$ be the estimated compressed length of p, and its value as expressed in equation (1).

Back to the questioned issue, given an unaligned dedupe candidate p, and its two potential targets t_1, t_2 the specialized circuitry calculates $\tilde{C}_p$ (see equation (1)) and then performed the following:

If ($\tilde{C}_p \le$ WELL_COMPRESSED_THRESHOLD)
    mark page p as unique and add it to the deepCompression candidates.
Else
    mark page p as unaligned dedupe of t_1, t_2.

In accordance with certain embodiments, there is a new efficient way to detect the most beneficial optimization (unaligned dedupe vs deep compression), without causing any additional latency to flush process. Such embodiments reduce read request latency without increasing memory usage.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Additionally, it should be understood that 4 KB was described above as being a standard page size in memory by way of example only. It should be understood that other page sizes are suitable for use as well (e.g., 1 KB, 2 KB, 8 KB, 16 KB, etc.).

Furthermore, processing of candidate data was described above as occurring during inline processing of the candidate data en route to secondary storage (e.g., during flushing). However, such selection between storage optimizations may also be applied to data at rest. Along these lines and in accordance with certain embodiments, the candidate data has already been flushed from cache and sits in a storage area for storage optimization evaluation (e.g., in a temporary holding area, in secondary storage, etc.). A background process may then evaluate and apply a particular storage optimization to the candidate data while the storage equipment simultaneously performs I/O operations to support a set of host computers. Accordingly, the storage equipment is still able to choose among storage optimizations when storing candidate data. Such modifications and enhancements are intended to belong to various embodiments of the disclosure.

What is claimed is:

1. A data storage method, comprising:
detecting that candidate data is deduplicatable within a storage array;
in response to detecting that the candidate data is deduplicatable within the storage array, evaluating whether to perform a compression operation on the candidate data in place of performing a deduplication operation on the candidate data and providing an optimization decision indicating whether to perform the compression operation on the candidate data in place of performing the deduplication operation on the candidate data; and
performing, within the storage array, a storage optimization operation on the candidate data based on the optimization decision, the storage optimization operation including one of the deduplication operation to deduplicate the candidate data and the compression operation to compress the candidate data;
wherein evaluating and providing includes:
    computing an estimated data compression size for the candidate data, and
    selecting, as the optimization decision, (i) a first value which identifies the compression operation when the estimated data compression size is less than a predefined threshold and (ii) a second value which identifies the deduplication operation when the estimated data compression size is greater than the predefined threshold;
wherein the storage array stores a first page and a second page, a dedupe candidate page of the candidate data being provided unaligned with native page boundaries by the first page and the second page; and
wherein computing the estimated data compression size includes:
    obtaining a first compressed length of the first page and a second compressed length of the second page, and
    deriving the estimated data compression size from the first compressed length and the second compressed length.

2. The method of claim 1 wherein the storage array stores previously-stored data which is unaligned with native page boundaries; and
wherein detecting that the candidate data is deduplicatable includes:
    ascertaining that the candidate data is able to be deduplicated using the previously-stored data which is unaligned with the native page boundaries.

3. The method of claim 2 wherein selecting includes:
providing a result signal indicating whether to perform a deep compression operation on the candidate data in place of performing an unaligned dedupe operation on the candidate data.

4. The method of claim 3 wherein the storage array stores the previously-stored data across multiple pages in which the previously-stored data starts in a middle of a first page and ends in a middle of a second page; and
wherein performing the storage optimization operation includes:
    based on the result signal, performing one of (i) an unaligned dedupe operation to deduplicate the candidate data using the previously-stored data stored across the multiple pages and (ii) a deep compression operation to compress multiple pages of data, the multiple pages of data including the candidate data.

5. The method of claim 1 wherein the dedupe candidate page is provided by a first amount of the first page and a second amount of the second page; and
wherein deriving the estimated data compression size includes:
    computing, as the estimated data compression size, a weighted average based on the first compressed length, the first amount of the first page, the second compressed length, and the second amount of the second page.

6. The method of claim 1, further comprising:

prior to detecting that candidate data is deduplicatable within the storage array, storing the first page and the second page within the storage array as at least part of a deep compression group.

7. The method of claim 1 wherein the storage array is constructed and arranged to perform inline unaligned deduplication and inline deep compression; and wherein the storage optimization operation is performed as the candidate data is being flushed en route along an input/output (I/O) path from a cache of the storage array to secondary storage of the storage array.

8. The method of claim 1 wherein the storage array is constructed and arranged to perform post-processing unaligned deduplication and post-processing deep compression; and wherein the storage optimization operation is performed as the candidate data is being post-processed after the candidate data has been flushed from a cache of the storage array.

9. Data storage equipment, comprising:

memory; and control circuitry coupled with the memory, the memory storing instructions which, when carried out by the control circuitry, cause the control circuitry to perform a method of:

detecting that candidate data is deduplicatable within a storage array, in response to detecting that the candidate data is deduplicatable within the storage array, evaluating whether to perform a compression operation on the candidate data in place of performing a deduplication operation on the candidate data and providing an optimization decision indicating whether to perform the compression operation on the candidate data in place of performing the deduplication operation on the candidate data, and performing, within the storage array, a storage optimization operation on the candidate data based on the optimization decision, the storage optimization operation including one of the deduplication operation to deduplicate the candidate data and the compression operation to compress the candidate data;

wherein evaluating and providing includes:

computing an estimated data compression size for the candidate data, and selecting, as the optimization decision, (i) a first value which identifies the compression operation when the estimated data compression size is less than a predefined threshold and (ii) a second value which identifies the deduplication operation when the estimated data compression size is greater than the predefined threshold;

wherein the storage array stores a first page and a second page, a dedupe candidate page of the candidate data being provided unaligned with native page boundaries by the first page and the second page; and wherein computing the estimated data compression size includes:

obtaining a first compressed length of the first page and a second compressed length of the second page, and deriving the estimated data compression size from the first compressed length and the second compressed length.

16

10. The data storage equipment of claim 9 wherein the storage array stores previously-stored data which is unaligned with native page boundaries; and wherein detecting that the candidate data is deduplicatable includes:

ascertaining that the candidate data is able to be deduplicated using the previously-stored data which is unaligned with the native page boundaries.

11. The data storage equipment of claim 10 wherein selecting includes:

providing a result signal indicating whether to perform a deep compression operation on the candidate data in place of performing an unaligned dedupe operation on the candidate data.

12. The data storage equipment of claim 11 wherein the storage array stores the previously-stored data across multiple pages in which the previously-stored data starts in a middle of a first page and ends in a middle of a second page; and wherein performing the storage optimization operation includes:

based on the result signal, performing one of (i) an unaligned dedupe operation to deduplicate the candidate data using the previously-stored data stored across the multiple pages and (ii) a deep compression operation to compress multiple pages of data, the multiple pages of data including the candidate data.

13. The data storage equipment of claim 9 wherein the dedupe candidate page is provided by a first amount of the first page and a second amount of the second page; and wherein deriving the estimated data compression size includes:

computing, as the estimated data compression size, a weighted average based on the first compressed length, the first amount of the first page, the second compressed length, and the second amount of the second page.

14. The data storage equipment of claim 9 wherein the method further comprises:

prior to detecting that candidate data is deduplicatable within the storage array, storing the first page and the second page within the storage array as at least part of a deep compression group.

15. A computer program product having a non-transitory computer readable medium which stores a set of instructions to perform data storage; the set of instructions, when carried out by computerized circuitry, causing the computerized circuitry to perform a method of:

detecting that candidate data is deduplicatable within a storage array;

in response to detecting that the candidate data is deduplicatable within the storage array, evaluating whether to perform a compression operation on the candidate data in place of performing a deduplication operation on the candidate data and providing an optimization decision indicating whether to perform the compression operation on the candidate data in place of performing the deduplication operation on the candidate data; and performing, within the storage array, a storage optimization operation on the candidate data based on the optimization decision, the storage optimization operation including one of the deduplication operation to deduplicate the candidate data and the compression operation to compress the candidate data;

wherein evaluating and providing includes:

computing an estimated data compression size for the candidate data, and selecting, as the optimization decision, (i) a first value which identifies the compression operation when the estimated data compression size is less than the predefined threshold and (ii) a second value which identifies the deduplication operation when the estimated data compression size is greater than a predefined threshold;

wherein the storage array stores a first page and a second page, a dedupe candidate page of the candidate data being provided unaligned with native page boundaries by the first page and the second page; and wherein computing the estimated data compression size includes:

obtaining a first compressed length of the first page and a second compressed length of the second page, and deriving the estimated data compression size from the first compressed length and the second compressed length.

16. The computer program product of claim 15 wherein the storage array stores previously-stored data which is unaligned with native page boundaries; and wherein detecting that the candidate data is deduplicatable includes:

ascertaining that the candidate data is able to be deduplicated using the previously-stored data which is unaligned with the native page boundaries.

17. The computer program product of claim 16 wherein selecting includes:

providing a result signal indicating whether to perform a deep compression operation on the candidate data in place of performing an unaligned dedupe operation on the candidate data.

18. The computer program product of claim 17 wherein the storage array stores the previously-stored data across multiple pages in which the previously-stored data starts in a middle of a first page and ends in a middle of a second page; and wherein performing the storage optimization operation includes:

based on the result signal, performing one of (i) an unaligned dedupe operation to deduplicate the candidate data using the previously-stored data stored across the multiple pages and (ii) a deep compression operation to compress multiple pages of data, the multiple pages of data including the candidate data.

19. The computer program product of claim 15 wherein the dedupe candidate page is provided by a first amount of the first page and a second amount of the second page; and wherein deriving the estimated data compression size includes:

computing, as the estimated data compression size, a weighted average based on the first compressed length, the first amount of the first page, the second compressed length, and the second amount of the second page.

20. The computer program product of claim 15, further comprising:

prior to detecting that candidate data is deduplicatable within the storage array, storing the first page and the second page within the storage array as at least part of a deep compression group.

* * * * *